(12) United States Patent
Dobbek

(10) Patent No.: US 6,308,325 B1
(45) Date of Patent: *Oct. 23, 2001

(54) APPARATUS AND METHOD FOR DOWNLOADING DATA TO ELECTRONIC DEVICE

(75) Inventor: Jeffrey J. Dobbek, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/631,650

(22) Filed: Apr. 9, 1996

(51) Int. Cl.[7] .................................................. G06F 9/445
(52) U.S. Cl. ................................................................ 717/11
(58) Field of Search ..................................... 345/675, 380, 345/381, 651, 925; 710/104; 713/1; 709/321

(56) References Cited

U.S. PATENT DOCUMENTS

| | | |
|---|---|---|
| 4,897,813 | 1/1990 | Kumbasar . |
| 4,974,151 * | 11/1990 | Advani et al. ........................ 395/828 |
| 5,249,279 * | 9/1993 | Schmenk et al. ..................... 395/825 |
| 5,291,585 | 3/1994 | Sato et al. . |
| 5,313,592 * | 5/1994 | Buondonno et al. ................. 710/104 |
| 5,367,686 | 11/1994 | Fisher et al. . |
| 5,442,789 | 8/1995 | Baker et al. . |
| 5,459,854 * | 10/1995 | Sherer et al. ......................... 395/651 |
| 5,481,709 | 1/1996 | Bealkowski et al. . |
| 5,499,295 | 3/1996 | Cooper . |
| 5,524,204 * | 6/1996 | Verdoorn ......................... 395/182.04 |
| 5,659,800 * | 8/1997 | Zhang et al. ......................... 395/882 |

OTHER PUBLICATIONS

H. Asano, "Micro–Code Download Method in Hard Disk Drive," *IBM Technical Disclosure Bulletin*, vol. 38, No. 3, Mar. 1995, p. 131.

* cited by examiner

Primary Examiner—Majid A. Banankhah
Assistant Examiner—Sue Lao
(74) Attorney, Agent, or Firm—Altera Law Group, LLC

(57) ABSTRACT

An apparatus and method of downloading data in the form of a device type generic "download entity" (or data object) for use by an electronic device. The device type of the electronic device is determined and any data in the download entity which is not associated with the determined device type is discarded such that only the data which is associated with the determined device type is retained by the electronic device. Installation code is also incorporated into the download entity such that, once downloaded, the installation code is executed by the electronic device to "unpack" and store the data associated with the device type from the download entity.

13 Claims, 5 Drawing Sheets

APPARATUS AND METHOD FOR DOWNLOADING DATA TO ELECTRONIC DEVICE

BACKGROUND OF THE INVENTION

1. Field of the Invention

This invention relates in general to downloading data such as parameters and/or program code to an electronic device, and more particularly, to the provision of a generic "download entity" (or data object) for use by an electronic device such as a disk drive, where only data from the download entity which is associated with a determined device type for the electronic device is retained by the electronic device.

2. Description of Related Art

As products are offered with a wider variety of specifications, capacities and features, it becomes increasingly difficult and costly to develop, produce, maintain and support these products. For example, disk drives may be designed with varying capacities, data transfer rates, communication interfaces (e.g., IDE or SCSI), etc. Within a given product line, while a significant portion of the drive mechanical and hardware components may be shared by different models, there may still be significant design variations, e.g., different numbers/sizes of disks and different numbers of heads. Similarly, while the basic functions and operations of the program code (which may include instructions, parameters, and other data) in a line of disk drives may be similar, the differences between models require differences in the program code for each model.

One approach for supporting the program code requirements of multiple models or designs is to generate a single program code implementation that, depending upon the "device type" of the particular device in which the program code is installed, executes different routines and/or utilizes different parameters to in effect customize the program code for the particular device. However, maintaining duplicate routines and parameter tables to support multiple device types greatly increases space requirements. Moreover, the additional processing required for runtime support of multiple device types may adversely impact drive performance.

Another approach for supporting multiple device types is to generate separate "versions" of the program code for different device types, then load only one version into a particular device. However, this requires knowledge at the downloading end (either by an operator or a downloading computer) of the device type of the device to be loaded.

This requirement has drawbacks in many applications such as disk drive arrays where multiple disk drives are linked together and controlled by an array controller, since different types of drives may be used together. Downloading to different drives in the array (e.g., to provide program code updates) may be burdensome and time consuming, and it may be difficult for a manufacturer to support multiple device types. Moreover, automated downloading may be particularly burdensome if it is difficult for the array controller to detect the device type of each drive.

Therefore, a substantial need has arisen for a manner of downloading data such as operating instructions, parameters and the like to electronic devices which supports multiple device types with minimum space requirements and without requiring knowledge of the device type by the downloading system.

SUMMARY OF THE INVENTION

To overcome the limitations in the prior art described above, and to overcome other limitations that will become apparent upon reading and understanding the present specification, the present invention discloses an apparatus and method for downloading data in the form of a device type generic "download entity" (or data object) to an electronic device. By determining the device type of the electronic device and discarding any data in the download entity which is not associated with the determined device type, only the data which is associated with the determined device type is retained by the electronic device. The data in the download entity may include program code for execution on the electronic device and/or,.device parameters and other is information that is utilized by the electronic device.

Preferred embodiments of the invention may also incorporate installation code into the download entity that, once downloaded, is executed to "unpack" and store the data associated with the device type from the download entity. By utilizing separate installation code in the download entity, installation functions may be omitted from the runtime code in the device, thereby minimizing the amount of extraneous code (i.e., code that is used only during installation and not during runtime) that must remain resident in the device.

Therefore, in accordance with the invention, there is provided a method for downloading data to an electronic device, the electronic device having a device type that is one of a plurality of device types. The method includes the steps of receiving a download entity in the electronic device, the download entity including data associated with each device type; determining the device type of the electronic device; and discarding the data in the download entity not associated with the determined device type such that only data associated with the determined device type is retained by the electronic device.

In accordance with another aspect of the invention, an is electronic device is provided having a device type that is one of a plurality of device types. The device includes memory means for storing operational data utilized during operation of the electronic device; receiver means for receiving a data object externally from the electronic device, the data object including data associated with a plurality of device types; and installation means for installing in the memory means only data from the data object that is associated with the device type of the electronic device.

According to a further aspect of the invention, a disk drive is provided, which includes a communications interface for receiving a download entity, the download entity including data associated with a plurality of types of disk drives; a memory for storing operational data associated with the disk drive; and a controller, coupled to the communications interface, the controller (1) determining a type for the disk drive, (2) retrieving from the download entity only the data associated with the determined type for the disk drive, (3) storing the data associated with the determined type for the disk drive in the memory, and (4) discarding any data in the download entity not associated with the determined type for the disk drive.

In accordance with an additional aspect of the invention, there is provided an apparatus, which includes an array of direct access storage devices, each of which having a device type and a memory for storing operational data utilized in the operation thereof; and an array controller or other control means (e.g., a processor used for field testing) controlling the array of direct access storage devices, the array controller providing a generic download entity to a plurality of the direct access storage devices to update the memories thereof, the generic download entity including operational data associated with a plurality of device types; wherein each of the plurality of direct access S storage devices stores in its memory only operational data from the download entity that is associated with its respective device type and discards the operational data not associated with its respective device type.

According to another aspect of the invention, a download entity is provided for downloading to an electronic device having a device type that is one of a plurality of device types. The download entity includes a block of data, the data block having portions associated with each of the plurality of device types; and an installation routine, executable by the electronic device, for retrieving only the portion of the data in the download entity that is associated with the device type of the electronic device.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof and in which is shown by way of illustration the specific embodiment in which the invention may be practiced. It is to be understood that other embodiments may be utilized as structural changes may be made without departing from the scope of the present invention.

Figure 1:
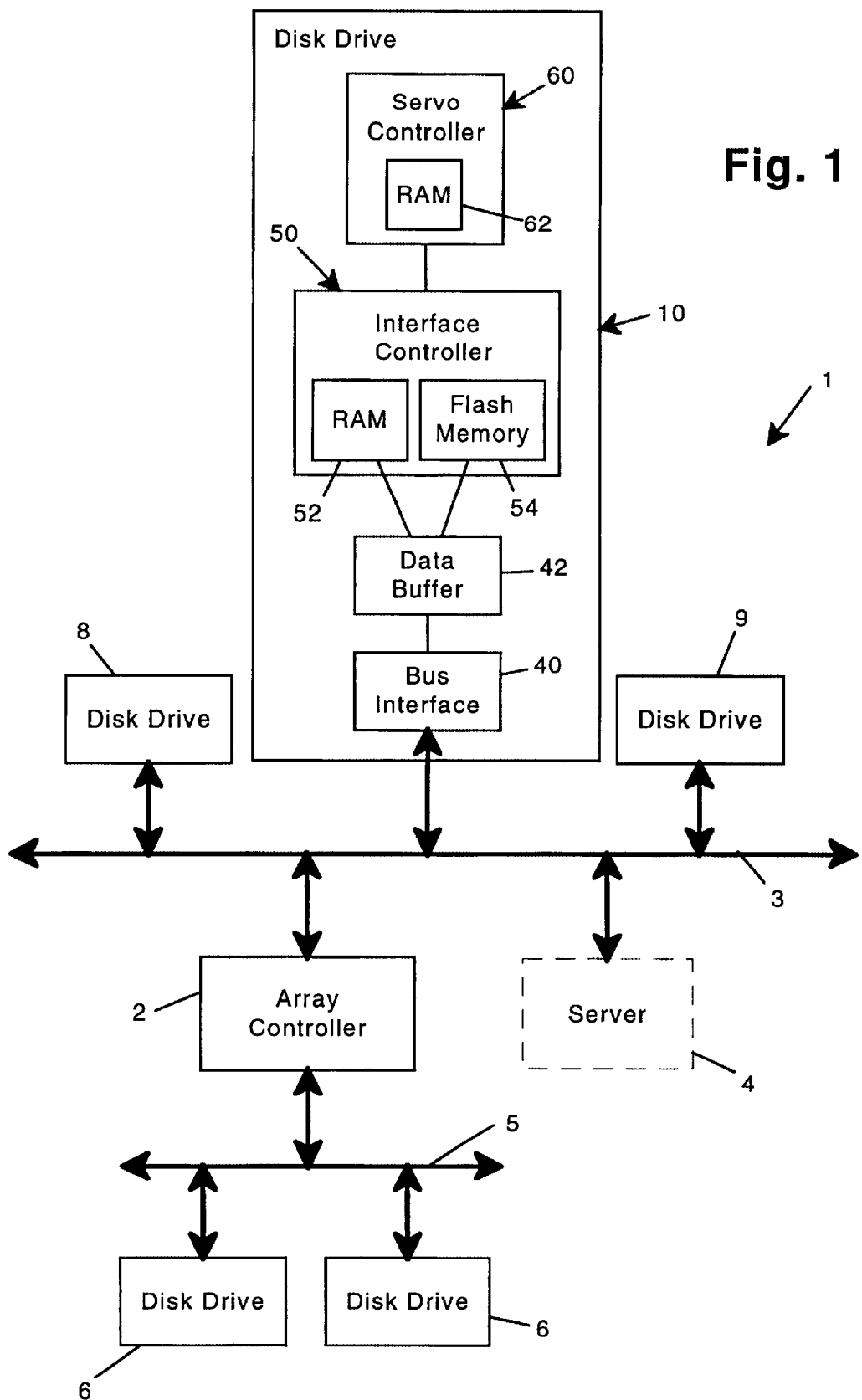
FIG. 1 is a functional block diagram of a preferred apparatus having a disk drive array consistent with the principles of the invention.

FIG. 1 illustrates an exemplary disk drive array apparatus 1 showing one preferred application of the present invention. Apparatus 1 preferably includes a plurality of disk drives, e.g., disk drives 8, 9 and 10, interconnected to an array controller 2 via a bus 3. Array controller 2 in the preferred embodiments operates as a host computer for supplying the download entity to the disk drives in apparatus 1.

Array controller 2 is preferably a RAMAC array controller available from International Business Machines Corporation, although other known array controllers may be used in the alternative. As shown in FIG. 1, array controller 2 may also control other disk drive arrays, e.g., disk drives 6 coupled through bus S. Moreover, instead of an array controller, the drives in the disk drive array may be connected to and controlled by another host computer such as a server computer system 4. Also, a host computer may be used during manufacturing to provide initial data and code to one or more of the drives.

In general, it should be appreciated that while the preferred electronic device is a disk drive, the principles of the invention may be applied to download data to practically any electronic device. Moreover, while the source of the downloaded data in the preferred embodiment is an array controller or server, the source of the downloaded data may be any source of data, whether a computer, electronic device, or program storage medium, which may connect and provide download data to an electronic device. Thus, the preferred application shown herein is merely exemplary in nature.

Figure 2:
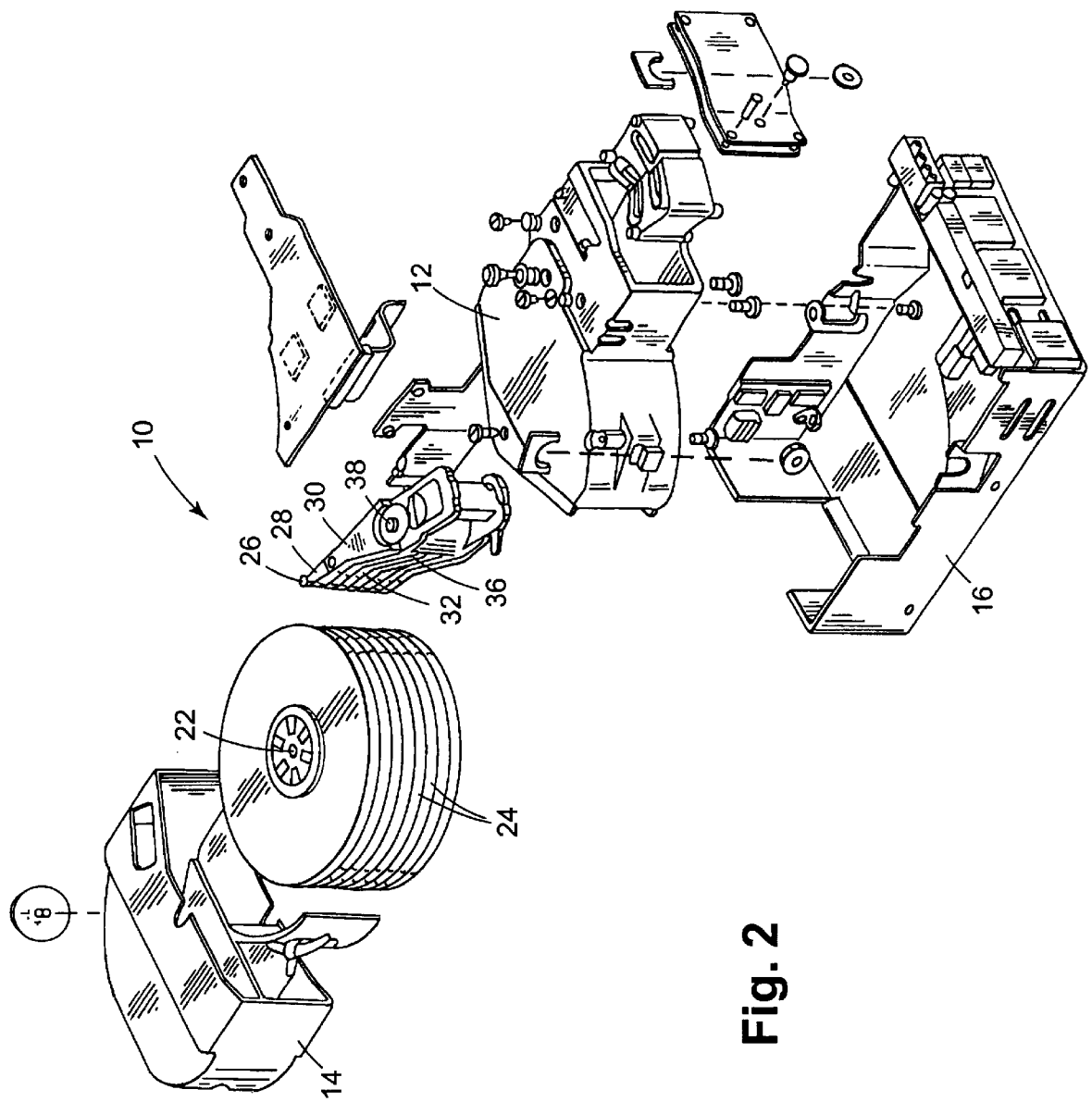
FIG. 2 is an exploded perspective view of the mechanical components in a disk drive from the disk drive array of FIG. 1.

Disk drives 8, 9 and 10 are preferably 18 head 7200 RPM disk drives (e.g., Scorpion disk drives available from International Business Machines Corporation). The mechanical components of disk drive or magnetic storage system 10 are shown in greater detail in FIG. 2. The disk drive includes a housing 12 and a housing cover 14 which, after assembly, is mounted within a frame 16. Mounted within the housing is a spindle shaft 22. Rotatably attached to the spindle shaft 22 are a number of magnetic storage disks 24. In FIG. 2, nine disks 24 are attached to the spindle shaft 22 in spaced apart relation. The disks 24 rotate on spindle shaft 22 which is powered by a motor (not shown). Information is written on or read from the disks 24 by heads or magnetic transducers (not shown) which are supported by sliders 26. Sliders 26 are coupled to the suspensions or load springs 28. The load springs 28 are attached to separate arms 30 on an E block or comb 32. The E block or comb 32 is attached at one end of an actuator arm assembly 36. The actuator arm assembly 36 is rotatably attached within the housing 12 on an actuator shaft 38. The rotary actuator assembly 36 moves the integrated transducer/suspension assembly in an arcuate path across the surface of the storage disk 24. However, the invention is not meant to be limited to the particular disk drive described herein, as any configuration of disk drive or direct access storage device (DASD) may be used consistent with the invention.

Returning to FIG. 1, the controller or functional components of disk drive 10 are illustrated in greater detail. The primary disk drive control operations are shared by a pair of controllers, interface controller 50 and servo controller 60. It should be appreciated that, while controllers 50 and 60 are preferably implemented with separate processors, the functions of each may be handled as different tasks in a single processor as well.

Interface controller So coordinates the transfer of data into and out of disk drive 10. Program code for the interface controller is preferably stored in a non-volatile memory, e.g., flash memory 54, or on a reserved area of the disk itself, and work space for the controller is provided in random access memory (RAM) 52. Data that is transferred into and out of disk drive 10 is temporarily stored in a data buffer 42, and a communications interface, e.g., bus interface 40, formats data for communicating with array controller 2 over bus 3.

Servo controller 60 coordinates the movement of the integrated transducer/suspension assembly for acquisition and storage of data onto the magnetic storage disks. A RAM 62 provides work space for the operation of the servo controller, while program code therefor is stored either in RAM 62 or in a non-volatile memory (not shown).

The functional components illustrated herein for disk drive 10 are representative of standard operating functions of many disk drives. Moreover, the hardware implementations of these components are also representative of standard disk drive designs. Thus, the invention should not be limited to any particular hardware configuration.

Figure 3:
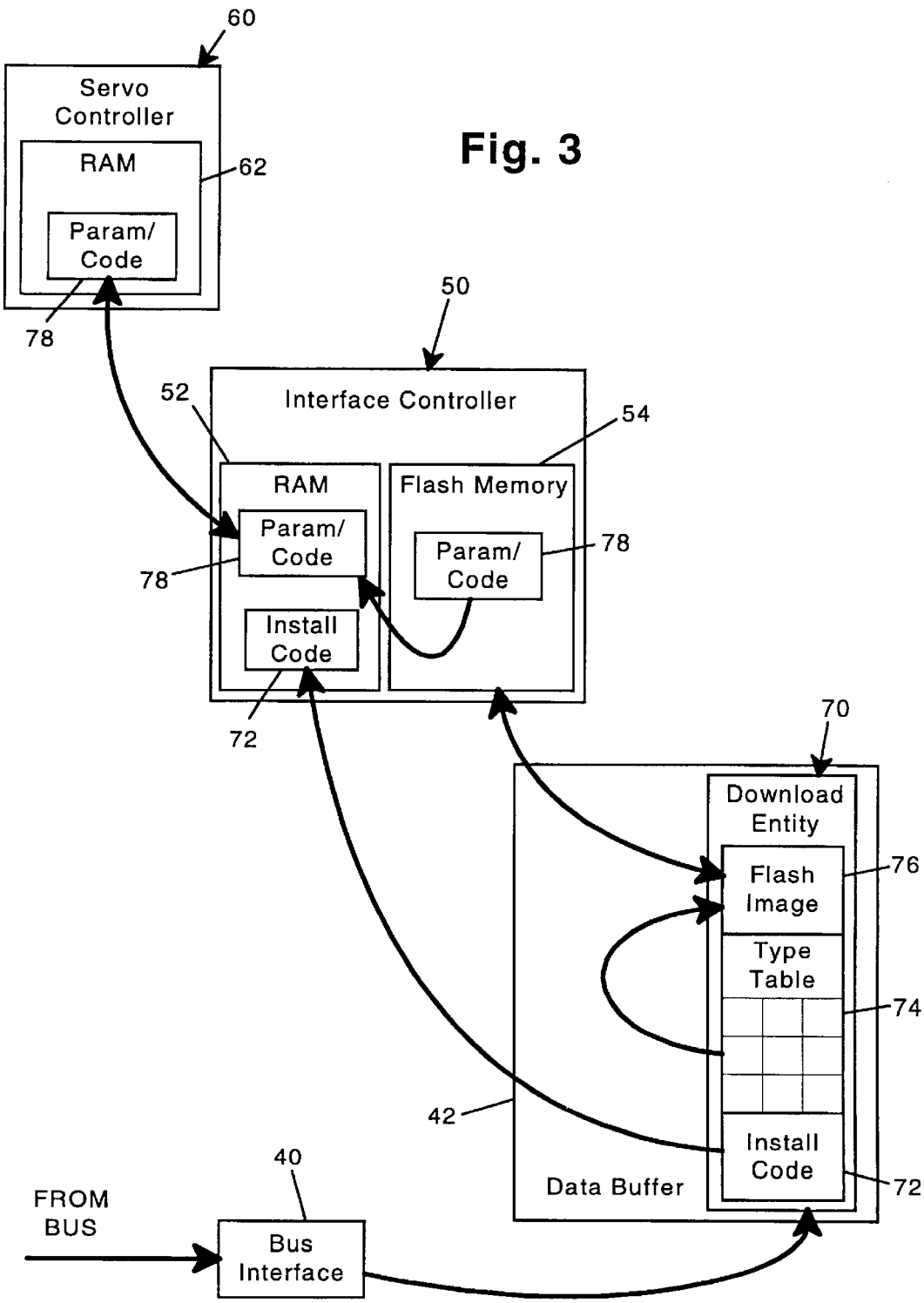
FIG. 3 is a functional block diagram of the controller components in a disk drive from the disk drive array of FIG. 1, illustrating information flow between the components during data downloading and installation.

The preferred embodiments of the invention download operational data ("data") to disk drive 10 through a download entity, or data object, functionally represented with reference number 70 in FIG. 3. The data downloaded to disk drive 10 may include program code, e.g., to be executed by interface controller 50 and/or servo controller 60, and/or may include other data such as operational parameters specific to disk drive 10. The types of parameters which may be utilized by disk drive 10 include dimensional parameters (e.g., number of heads, number of servo cells per revolution, etc.), physical parameters (e.g., arm length, moment of inertia of arm, stroke length, capable force factors, rotation speed, etc.), electrical parameters, servo system constants (utilized in servo algorithms), filter coefficients, and system flags (e.g., to enable/disable functions), among others.

Download of data to disk drive 10 may occur, for example during the manufacture of the drive, or may occur to update the program code and/or operating parameters to provide new functionality, correct any "bugs" in the program code, or otherwise modify the operation of disk drive 10.

Download entity 70 preferably includes a data block containing all of the program code and/or parameter data to accommodate multiple device types or models for disk drive 10. All of this information is preferably stored in a type table 74. In addition, installation code 72 is included in the download entity to install the proper components in disk drive 10 based upon its particular device type.

Consistent with the invention, the installation code utilizes the type table to retrieve from the download entity only program code and/or parameter data associated with the particular device type of disk drive 10 The associated data retrieved from the type table is preferably stored is ultimately in flash memory 54. A flash (or data) image block 76 is reserved in the download entity of the preferred embodiment for building the associated data to be stored in flash memory 54. Block 76 may initially include default values and routines so that only device type specific modifications may need to be retrieved from the download entity. Also, as discussed below, the current contents of the flash memory may also be copied to the image block to provide a basis for updating the flash memory with the data from the download entity.

Figure 4:
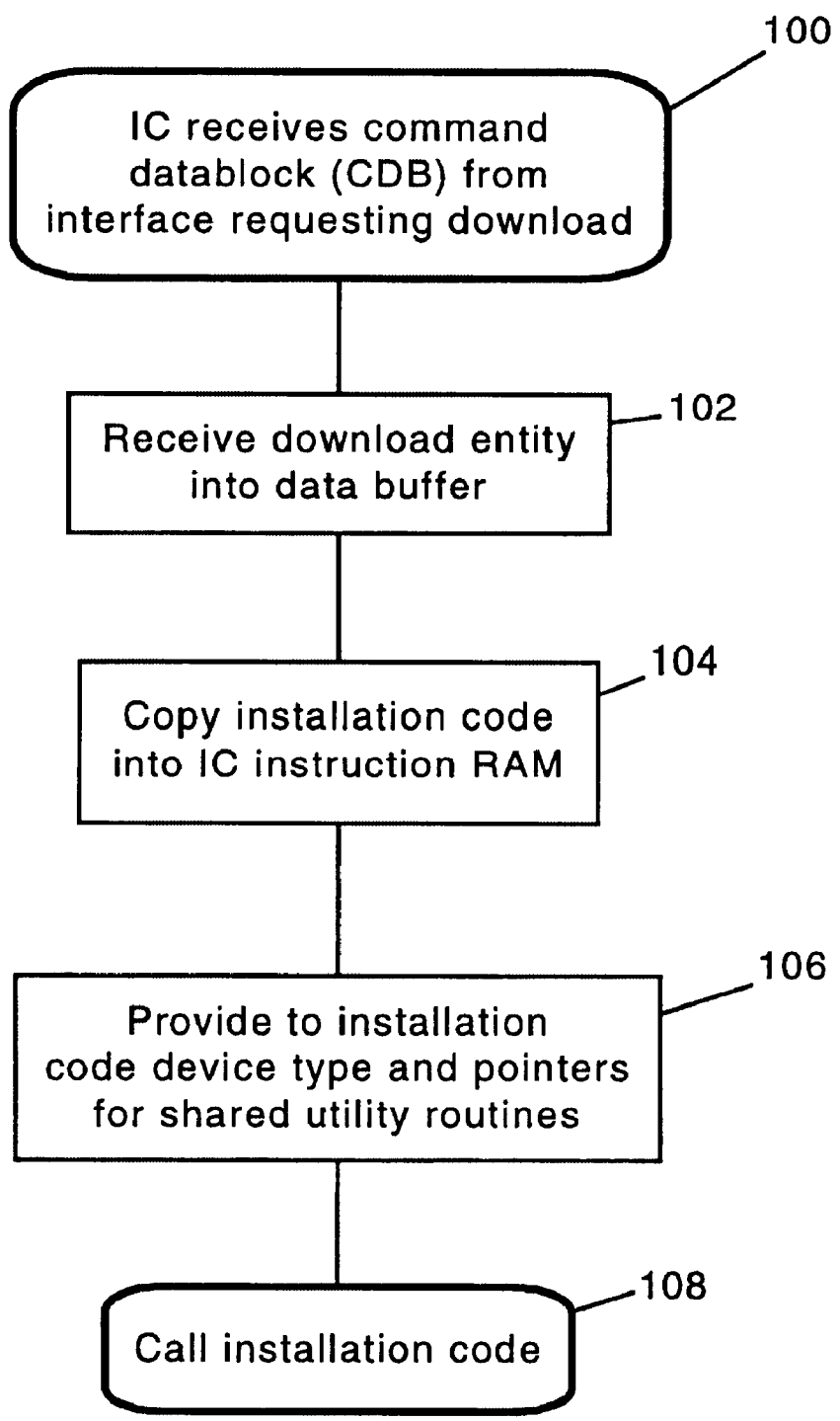
FIG. 4 is a flowchart illustrating the program flow in the disk drive of FIG. 3 during download of a download entity.
Figure 5:
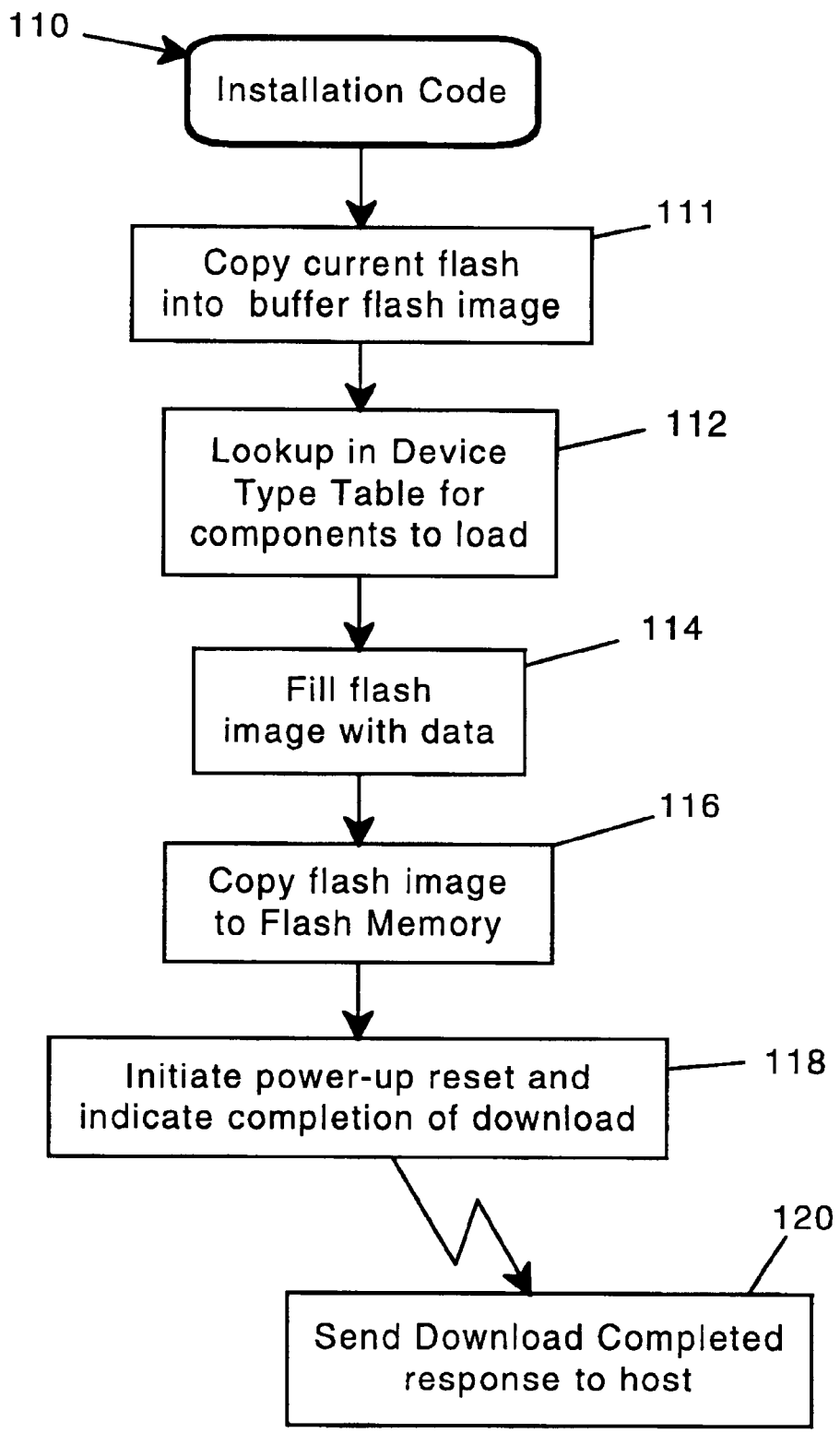
FIG. 5 is a flowchart illustrating the program flow of an installation routine downloaded with the download entity illustrated in FIG. 3.

To illustrate the operation of the preferred embodiments of the invention, the update of servo parameters for drive 10 is explained in conjunction with FIGS. 3–5. As shown in FIG. 3, the servo parameters are maintained in a parameter/code (or data) block 78 in flash memory 54. A copy of block 78 is also kept in RAM 62 for use by servo controller 60, as well as in RAM 52 of interface controller 50 to permit controller 50 to monitor calibration routines in servo controller 60.

FIG. 4 illustrates a download routine 100 executed by interface controller 50 in response to a download command datablock (CDB) sent over bus 3 by array controller 2 or another host computer in apparatus 1.

The download command is initially processed by interface controller 50 in the same manner as any other incoming datablock received by disk drive 10 over bus 3, in a manner generally understood in the art. Once the download command is received, however, a short bootstrap routine 100, initially resident in the flash memory, is executed to initiate processing of the download entity. Primary handling of the download entity installation, however, is preferably reserved for the installation code that is downloaded within the entity.

By including many of the installation processes within the download entity, the amount of permanent resident code in flash memory 54 that is dedicated to download processing is minimized. It will be appreciated that flash memory is comparatively expensive, so minimization of extraneous code is often desirable. Moreover, by including the installation code with the download entity, customized installation code may be developed to handle the download and selected by device type. However, it should be appreciated that all of the installation code may be permanently maintained in flash memory 54 and omitted from the download entity in the alternative.

Turning to FIG. 4, execution of routine 100 begins in block 102 by receiving download entity 70 from bus 3 into data buffer 42. As discussed above, the download entity includes installation code 72, type table 74, and flash image 76.

Next, in block 104, installation code 72 is copied into RAM 52 of interface controller 50. Then, in block 106, the copy of the installation code in RAM 52 is provided with pointers to any resident utility routines in flash memory 54 that may be utilized by installation code 72. The use of these shared routines may reduce the size of installation code 72 since functions and tools that are resident in flash memory 54 need not be duplicated in installation code 72. Also in block 104, it is preferable to provide a device type indication to the installation code so that the installation code recognizes the device type of the disk drive, for use as will be discussed in greater detail below.

Blocks 104 and 106 prepare the installation code for execution by interface controller 50. Consequently, upon execution of these blocks, the installation code is called in block 108 to pass control to the new code for data retrieval from download entity 70.

A preferred installation code or routine 110 is illustrated in FIG. 5. Execution of routine 110 begins in block 111, where the current contents of the flash memory are copied into the buffer flash image 76 to provide a basis from which updates to the flash memory may be made. It should be appreciated that only a small portion of the flash memory may need to be updated, and therefore it may be desirable to provide only updated data in the download entity, rather than having to build the entire flash memory from scratch. On the other hand, if the entire flash memory is provided with the download entity, block 111 may not be required.

Next, in block 112 device type table 74 is accessed to determine which components to retrieve from download entity 70. Then, in block 114, the image of the data is built in block 76 by retrieving the necessary components from the download entity and updating the relevant portions of the flash image. Once the new image is constructed, block 116 then writes the image into flash memory 54.

It should be appreciated that it may not be necessary to build a complete image of the flash in the data buffer before copying the image to the flash memory as disclosed herein. Rather, it may be possible to update the flash memory by writing directly thereto. However, some flash memories require that the entire memory space be cleared and rewritten in its entirety, and thus, it is preferred herein to first build the flash image in the data buffer and then write the updated image into the flash memory.

The "device type" of disk drive 10 preferably represents a particular model or design indicator. In the area of disk drives, this may represent models that are distinguished based upon memory capacity, data transfer rate, interface type (e.g., IDE, SCSI, etc.), number of disks and heads, and disk size, among others. For other electronic devices, other device types may be defined, which would vary significantly based upon the device. As one example, base and enhanced models may be distinguished so that only authorized functions and features are stored in a device. This enables the same hardware platform to be used for multiple models, multiple product lines or even for different products altogether (generically "electronic products"), with the controlling software tailored for particular device types. As another example, for a personal digital assistant (PDA), different device types may be distinguished based upon the language of the user, so that the messages displayed by the PDA will be in the user's native language. Innumerable other variations are possible within the scope of the invention.

In the preferred embodiments, the device type table is accessed via a device type indicator that is provided to the installation code by interface controller 50, preferably from a device type maintained in the flash memory, stored in another non-volatile device (e.g., DIP switches), or on the disk itself. Moreover, this device type may be rewritten by the installation code into the flash memory during the download process if necessary. The use of a specific device type indicator minimizes the complexity of the installation code. However, it is also possible for the installation code to determine the device type in other manners, e.g., by testing one or more device characteristics known to vary among different device types. For example, the number of heads in each device type may vary, whereby the installation code may detect the device type by energizing all heads and detecting the number of heads that respond. Other manners of detecting the device type internal to the disk drive may be used in the alternative.

Also in the preferred embodiments, device type table 74 provides separate tables for each parameter with an index table or map (indexed by device type) that generates indexes or pointers so that block 114 may pull parameter values from the parameter tables and thereby build flash image block 76. In the alternative, table 74 may provide complete parameter sets indexed by device type, whereby the operation of block 114 is primarily to copy a complete parameter set to block 76. The data in type table 74 may also be compressed and/or encoded, and then unpacked by the installation code. Other manners of storing data in the download entity for subsequent retrieval by the installation code may also be used in the alternative.

Additionally, retrieval of data from type table 74 may depend on other factors as well as device type. For example, the previous state or history of the drive may be a factor used in the selection of data from type table 74.

Returning to FIG. 5, once the flash image has been copied to flash memory 54, block 118 is executed to initiate a power-up reset on the drive. By initiating the power-up reset, the drive is reset to normal operating conditions. Data buffer 42 and RAMs 52 and 62 are cleared, thereby discarding the download entity and any data therein not associated with the device type of disk drive 10. The installation code is also preferably discarded in this process.

Block 118 may also include the step of saving a "key" or other indicator, preferably in one of RAMs 52, 62 or data buffer 42, or in a register, to indicate that the power-up reset is a result of a download. The power-up routine would then be required to check the appropriate location for the key during power-up and prior to clearing out the memories and registers in the system. Consequently, the power-up routine for drive 10 may include a step 120 for sending a completed response to the host computer initiating the download. Drive state information may also be saved by block 118 so that, upon power-up, the current drive conditions (or "drive state"), e.g., spin up status, etc., may be restored.

The preferred embodiments provide substantial benefits over conventional downloading methods. In particular, although multiple device types are supported by a single download entity, unused data is discarded, thereby reducing the size of the downloaded data. Moreover, specific runtime processing to handle multiple device types is eliminated. Given the expense of non-volatile (flash) memories, any manner of reducing memory space requirements is particularly beneficial.

Moreover, in applications such as disk drive arrays, the preferred embodiments further provide the benefit of substantially simplified and faster automated update of multiple disk drives. In particular, a single download entity may be downloaded by an array controller or other host computer to multiple disk drives, optionally simultaneously via a broadcast-type command. Each disk drive, based upon its recognized device type, then takes only the information associated with its device type from the download entity and discards the remaining information. As an additional benefit, only a single download entity need be supported, with the installation knowledge encoded within the download entity itself. Accordingly, no knowledge of device type is required for the operator or the host computer. Other advantages and benefits should be apparent to one of ordinary skill in the art.

It will be appreciated that the various data, program code, parameters, etc. in the download entity are resident at different times on one or more "program storage devices." Generically, the term "program storage device" may include any device or apparatus capable of storing information such as data or program code either in a volatile or non-volatile manner, including memory devices such as RAMS, ROMS, EPROMs. processor and cache memories, flash memories, etc.; as well as fixed or removable mass storage media such as magnetic disks (fixed or removable), CD-ROMs, magnetic tape, etc.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method executed by an electronic device wherein the electronic device downloads data, the electronic device having a device type that is one of a plurality of device types, the method comprising the steps of:

(a) receiving a download entity in a data buffer of the electronic device, the download entity including data in a device type table associated with each device type;

(b) providing to the download entity an indication of at least one device type associated with the electronic device;

(c) building a data image in a data image block of the download entity from data retrieved from the device type table;

(d) writing the data image block from the data buffer to the electronic device to provide the electronic device with data only associated with indicated device types associated with the electronic device, the writing further comprising
  (1) retrieving from the download entity an installation routine, wherein the installation routine is provided with pointers to utilities resident on the electronic device for executing the installation routine; and
  (2) executing the installation routine by the electronic device to store into non-volatile memory of the electronic device only the data associated with the indicated device types;
    wherein retrieving and executing are performed at least in part by a download processing routine resident in the electronic device; and
(e) initiating a reset to clear the data buffer.

2. The method of claim 1, wherein the data associated with the indicated device types are stored in non-volatile memory in the electronic device.

3. The method of claim 1, wherein the data in the download entity comprises program code for execution by the electronic device.

4. The method of claim 1, wherein the data in the download entity comprises device parameters characterizing the electronic device.

5. The method of claim 1, wherein the download processing routine is called in response to a download command transmitted from a host computer.

6. The method of claim 1, further comprising before building the data image in the data image block, copying the current contents of the non-volatile storage in the electronic device to the data image block.

7. The method of claim 1, wherein the providing step including the step of testing one or more operating characteristics of the electronic device, wherein the tested operating characteristics vary between different device types.

8. The method of claim 1, wherein the electronic device is a disk drive, the disk drive including the data buffer for receiving the download entity, and a first controller, coupled to the data buffer and utilizing the data associated with the indicated device types.

9. The method of claim 8, wherein the disk drive further includes the non-volatile memory, coupled to the first controller, for storing the data associated with the indicated device types.

10. The method of claim 8, wherein the data in the download entity includes servo parameters characterizing the disk drive, and wherein the disk drive further includes a second controller, coupled to the first controller, the second controller having a random access memory for storing the servo parameters associated with the indicated device types.

11. The method of claim 10, wherein the first and second controllers comprise the same processor.

12. The method of claim 8, wherein the disk drive is one of an array of disk drives controlled by an array controller, the method further comprising the step of transmitting the download entity to a plurality of disk drives in the array; whereby each of the plurality of disk drives retains only the data in the download entity associated with its determined device type.

13. The method of claim 1, wherein the device type table is indexed by device type.

* * * * *

UNITED STATES PATENT AND TRADEMARK OFFICE
CERTIFICATE OF CORRECTION

PATENT NO.    : 6,308,325 B1
DATED         : October 23, 2001
INVENTOR(S)   : Dobbek, Jeffrey J.

It is certified that error appears in the above-identified patent and that said Letters Patent is hereby corrected as shown below:

Column 2,
Line 11, please delete ",." after the words "and/or";
Line 11, please delete "is" listed at the end of the line.

Column 3,
Line 1, please delete "S" after the word "access".

Column 4,
Line 3, please replace "S" with the number -- 5 --.
Line 55, please replace "So" with the number -- 50 --.

Signed and Sealed this

Fifteenth Day of April, 2003

JAMES E. ROGAN
*Director of the United States Patent and Trademark Office*